US006169242B1

(12) United States Patent
Fay et al.

(10) Patent No.: US 6,169,242 B1
(45) Date of Patent: Jan. 2, 2001

(54) TRACK-BASED MUSIC PERFORMANCE ARCHITECTURE

(75) Inventors: Todor C. Fay, Bellevue; Mark T. Burton, Redmond, both of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/243,326

(22) Filed: Feb. 2, 1999

(51) Int. Cl.[7] ............................ A63H 5/00; G04B 13/00; G01H 7/00

(52) U.S. Cl. ................................ 84/609; 84/613; 84/645

(58) Field of Search ............................ 84/601, 609, 613, 84/634, 637, 645

(56) References Cited

U.S. PATENT DOCUMENTS

| | | | |
|---|---|---|---|
| 4,526,078 | 7/1985 | Chadabe | 84/1.03 |
| 4,716,804 | 1/1988 | Chadabe | 84/1.03 |
| 5,052,267 | 10/1991 | Ino | 84/613 |
| 5,164,531 | 11/1992 | Imaizumi et al. | 84/634 |
| 5,179,241 | 1/1993 | Okuda et al. | 84/613 |
| 5,218,153 | 6/1993 | Minamitaka | 84/613 |
| 5,278,348 | 1/1994 | Eitaki et al. | 84/636 |
| 5,281,754 | 1/1994 | Farrett et al. | 84/609 |
| 5,286,908 | 2/1994 | Jungleib | 81/603 |
| 5,315,057 | 5/1994 | Land et al. | 84/601 |
| 5,355,762 | 10/1994 | Tabata | 84/609 |
| 5,455,378 | 10/1995 | Paulson et al. | 84/610 |
| 5,496,962 | 3/1996 | Meier et al. | 84/601 |
| 5,596,159 * | 1/1997 | O'Connell | 84/645 X |
| 5,734,119 * | 3/1998 | France et al. | 84/645 X |
| 5,753,843 | 5/1998 | Fay | 84/609 |
| 5,902,947 * | 5/1999 | Burton et al. | 84/609 X |

* cited by examiner

*Primary Examiner*—Jeffrey Donels
(74) *Attorney, Agent, or Firm*—Lee & Hayes, PLLC

(57) ABSTRACT

The invention utilizes segments and tracks to generate and playback musical performances. A segment is implemented as a programming object, and represents a specified musical piece. The segment comprises a plurality of tracks, each of which is implemented as a programming object. The tracks are of different types, and generate music in a variety of ways. However, every track supports an identical track interface that is utilized by the segment object. To play the musical piece, a performance supervisor makes repeated calls to the segment object to play specified intervals of the musical piece. In response, the segment object calls its track objects, requesting them to play the specified interval. The tracks generate the requested interval in accordance with their own methods. In some cases, the track objects communicate and cooperate with each other to generate their musical tracks.

45 Claims, 4 Drawing Sheets

TRACK-BASED MUSIC PERFORMANCE ARCHITECTURE

TECHNICAL FIELD

This invention relates to systems and methods for computer generation of musical performances. Specifically, the invention relates to a software architecture that allows a music generation and playback program to play music based on new technologies, without modifying the playback program itself.

BACKGROUND OF THE INVENTION

Musical performances have become a key component of electronic and multimedia products such as stand-alone video game devices, computer-based video games, computer-based slide show presentations, computer animation, and other similar products and applications. As a result, music generating devices and music playback devices are now tightly integrated into electronic and multimedia components.

Musical accompaniment for multimedia products can be provided in the form of digitized audio streams. While this format allows recording and accurate reproduction of non-synthesized sounds, it consumes a substantial amount of memory. As a result, the variety of music that can be provided using this approach is limited. Another disadvantage of this approach is that the stored music cannot be easily varied. For example, it is generally not possible to change a particular musical part, such as a bass part, without re-recording the entire musical stream.

Because of these disadvantages, it has become quite common to generate music based on a variety of data other than pre-recorded digital streams. For example, a particular musical piece might be represented as a sequence of discrete notes and other events corresponding generally to actions that might be performed by a keyboardist—such as pressing or releasing a key, pressing or releasing a sustain pedal, activating a pitch bend wheel, changing a volume level, changing a preset, etc. An event such as a note event is represented by some type of data structure that includes information about the note such as pitch, duration, volume, and timing. Music events such as these are typically stored in a sequence that roughly corresponds to the order in which the events occur. Rendering software retrieves each music event and examines it for relevant information such as timing information and information relating the particular device or "instrument" to which the music event applies. The rendering software then sends the music event to the appropriate device at the proper time, where it is rendered. The MIDI (Musical Instrument Digital Interface) standard is an example of a music generation standard or technique of this type, which represents a musical performance as a series of events.

There are a variety of different techniques for storing and generating musical performances, in addition to the event-based technique utilized by the MIDI standard. As one example, a musical performance can be represented by the combination of a chord progression and a "style". The chord progression defines a series of chords, and the style defines a note pattern in terms of chord elements. To generate music, the note pattern is played against the chords defined by the chord progression. A scheme such as this is described in a previously A "template" is another example of a way to represent a portion of a musical performance. A template works in conjunction with other composition techniques to create a unique performance based on a musical timeline.

U.S. Pat. No. 5,753,843, issued to Microsoft Corporation on May 19, 1998, describes a system that implements techniques such as those described above. These different techniques correspond to different ways of representing music. When designing a computer-based music generation and playback system, it is desirable for the system to support a number of different music representation technologies and formats, such as the MIDI, style and chord progression, and template technologies mentioned above. In addition, the playback and generation system should support the synchronized playback of traditional digitized audio files, streaming audio sources, and other combinations of music-related information such as lyrics in conjunction with sequenced notes.

However, it is impossible to anticipate the development of new music technologies. Because of this, a given music performance program might need significant re-writing to support a newly developed music technology. Furthermore, as more and more performance technologies are added to an application program, the program becomes more and more complex. Such complexity increases the size and cost of the program, while also increasing the likelihood of program bugs.

SUMMARY OF THE INVENTION

The invention allows a music playback program or performance supervisor to accommodate different types of playback technologies and formats without requiring such technologies to be embedded in the program itself. A piece of music is embodied as a programming object, referred to herein as a segment or segment object. The segment object has an interface that can be called by the playback program to play identified intervals of the music piece.

Each segment comprises a plurality of tracks, embodied as track objects. The track objects are of various types for generating music in a variety of different ways, based on a variety of different data formats. Each track, regardless of its type, supports an identical interface, referred to as a track interface, that is available to the segment object. When the segment object is instructed to play a music interval, it passes the instruction on to its constituent tracks, which perform the actual music generation.

In some cases, the tracks cooperate with each other to produce the music. Inter-track interfaces can be implemented to facilitate communication between the tracks. Tracks are distinguished from each other by object type identifiers, group specifications, and index values.

This architecture allows a musical piece to be embodied as a segment, with the details of the music generation being hidden within the track objects of the segment. As a result, the playback program does not need to implement methodologies for actual music generation techniques. Therefore, the playback program is compatible with any future methods of music generation, and will not need to be modified to support any particular music generation technique.

DETAILED DESCRIPTION

Computing Environment

Figure 1:
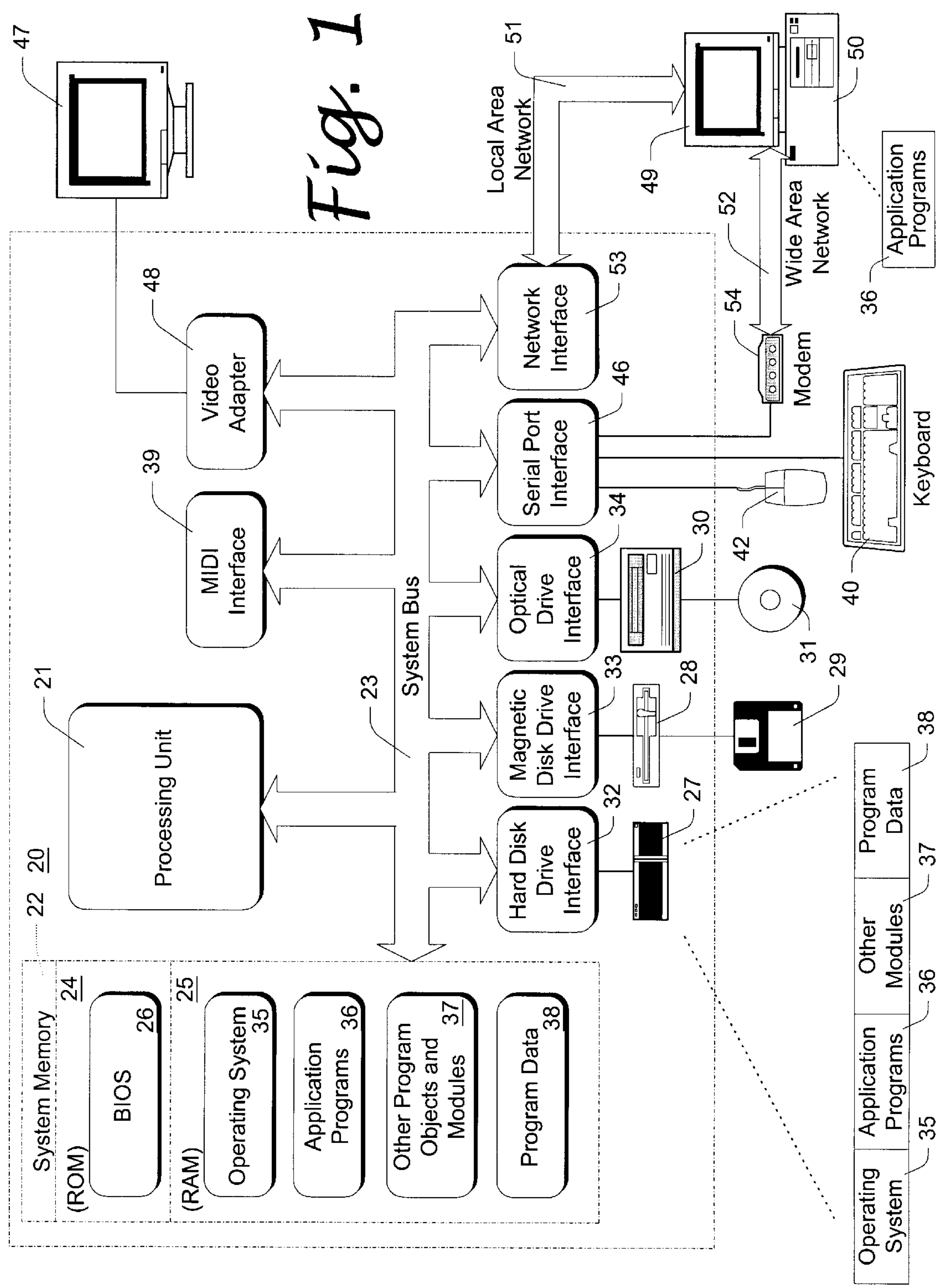
FIG. 1 is a block diagram of a computer system that implements the invention.

FIG. 1 and the related discussion are intended to provide a brief, general description of a suitable computing environment in which the invention may be implemented. Although not required, the invention will be described in the general context of computer-executable instructions, such as programs and program modules that are executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

An exemplary system for implementing the invention includes a general purpose computing device in the form of a conventional personal computer 20, including a microprocessor or other processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

RAM 25 forms executable memory, which is defined herein as physical, directly-addressable memory that a microprocessor accesses at sequential addresses to retrieve and execute instructions. This memory can also be used for storing data as programs execute.

A number of programs and/or program modules may be stored on the hard disk, magnetic disk 29 optical disk 31, ROM 24, or RAM 25, including an operating system 35, one or more application programs 36, other program objects and modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

Computer 20 includes a musical instrument digital interface ("MIDI") component 39 that provides a means for the computer to generate music in response to MIDI-formatted data. In many computers, such a MIDI component is implemented in a "sound card," which is an electronic circuit installed as an expansion board in the computer. The MIDI component responds to MIDI events by playing appropriate tones through the speakers of the computer.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described.

For purposes of illustration, programs and other executable program components such as the operating system are illustrated herein as discrete blocks, although it is recognized that such programs and components reside at various times in different storage components of the computer, and are executed by the data processor(s) of the computer.

The illustrated computer uses an operating system such as the "Windows" family of operating systems available from Microsoft Corporation. An operating system of this type can be configured to run on computers having various different hardware configurations, by providing appropriate software drivers for different hardware components. The functionality described below is implemented using standard programming techniques, including the use of OLE (object linking and embedding) and COM (component object interface) interfaces such as described in Rogerson, Dale, *Inside COM*; Microsoft Press, 1997. Familiarity with object based programming, and with COM objects in particular, is assumed throughout this disclosure.

General Object Architecture

Figure 2:
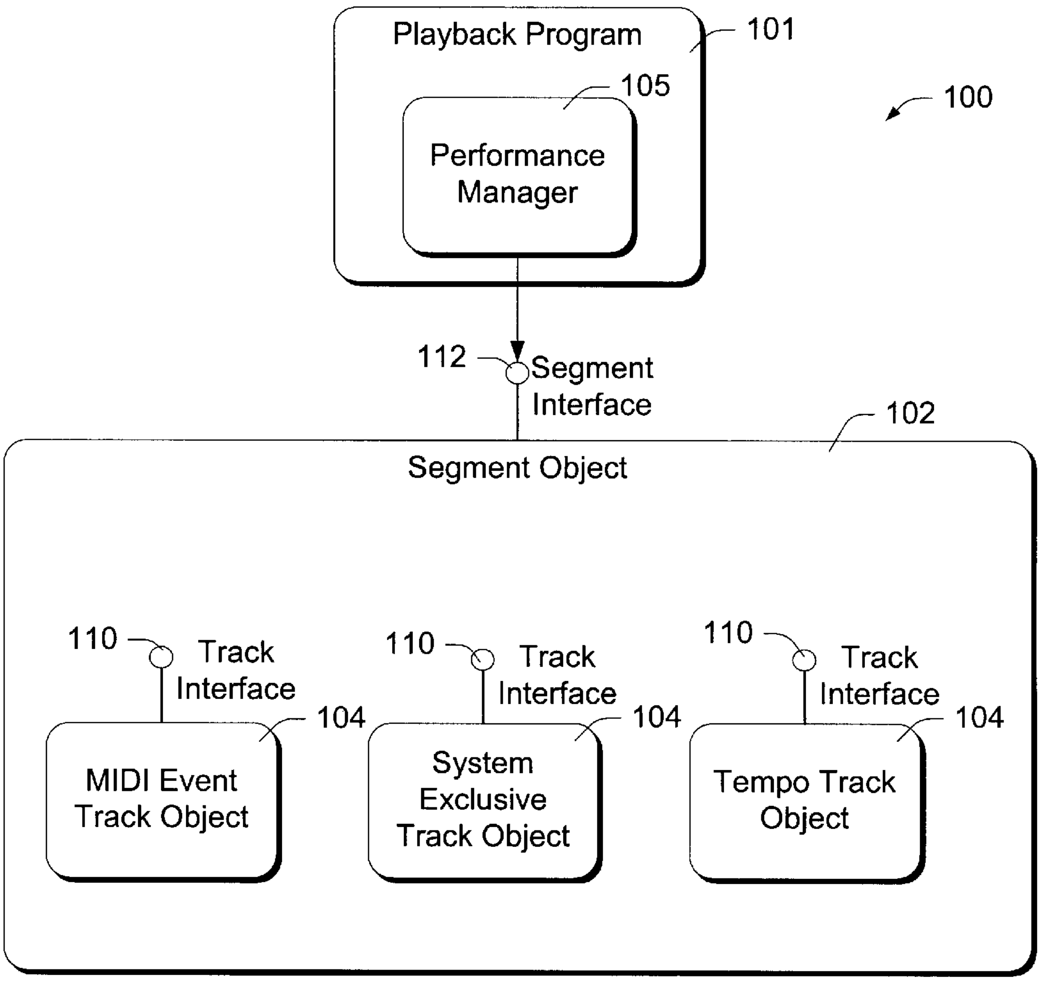
FIG. 2 is a block diagram of software components in accordance with the invention for rendering MIDI-based music.

FIG. 2 shows a music generation or playback system 100 in accordance with the invention. In the described embodiment of the invention, various components are implemented as COM objects in system memory 22 of computer 20. The COM objects each have one or more interfaces, and each interface has one or more methods. The interfaces and interface methods can be called by application programs and by other objects. The interface methods of the objects are executed by processing unit 21 of computer 20.

Music generation system 100 includes a playback program 101 for playing musical pieces that are defined by segment objects 102 and track objects 104. The playback program has a performance manager 105 (implemented as a COM object) that makes the actual calls to a segment object, to control playback of musical pieces.

A segment object 102 is an instantiation of a COM object class, and represents a musical piece or segment. A musical segment is a song or some other linear interval of music. In accordance with the invention, each segment is made up of one or more tracks, which are represented as track objects 104. The tracks represented by the track objects are played together to render the musical piece represented by the segment object.

Generally, the track objects generate instructions for actual music generation components such as computer-integrated MIDI components and other computer based music rendering components. For example, MIDI rendering components are instructed by sending MIDI event structures, system exclusive messages, and tempo instructions. In one embodiment of the invention, the various track objects are configured to generate such MIDI instructions, though such instructions might result from non-MIDI music generation techniques.

There can be many different types of tracks and corresponding track objects, corresponding to different music generation techniques. A set of track objects might correspond to a particular music generation technique, such as MIDI sequencing. A set of MIDI track objects includes an event track object, a system exclusive track object, and a tempo map track object. These objects correspond to conventional tracks of a MIDI sequence. Another set of track objects might correspond to a style-based chord progression music generation technique. Such a set includes a chord progression track object and a style track object or style-based performance track object. The style track object plays a chord progression defined by the chord progression track. In the described embodiment of the invention, the track objects of a set cooperate and communicate with each other through intertrack interfaces to play the music defined by the tracks. In an alternative embodiment, described in a concurrently-filed US Patent Application entitled "Inter-Track Communication of Musical Performance Data," by inventors Todor C. Fay and Mark T. Burton, data is communicated through facilities provided by an intermediary such as performance manager 105. This allows the performance manager to decide upon appropriate track sources when other track objects request controlling data of a certain type.

FIG. 2 is an example of a segment having a structure that is conveniently used for representing MIDI files. This segment includes three track objects 104. An event track object can be used to render or generate standard MIDI event messages, such as notes, pitch bends, and continuous controllers. A system exclusive track object can be used to generate MIDI system exclusive messages. A tempo map track object can be used to generate changes in tempo, packaged as events. When this structure is used in conjunction with MIDI data, each track reads a corresponding MIDI data stream, parses the data stream, and sends resulting instructions to a MIDI-based rendering component. These track objects do not normally participate in shaping the generated music-the music is defined entirely by the original MIDI data stream.

Figure 3:
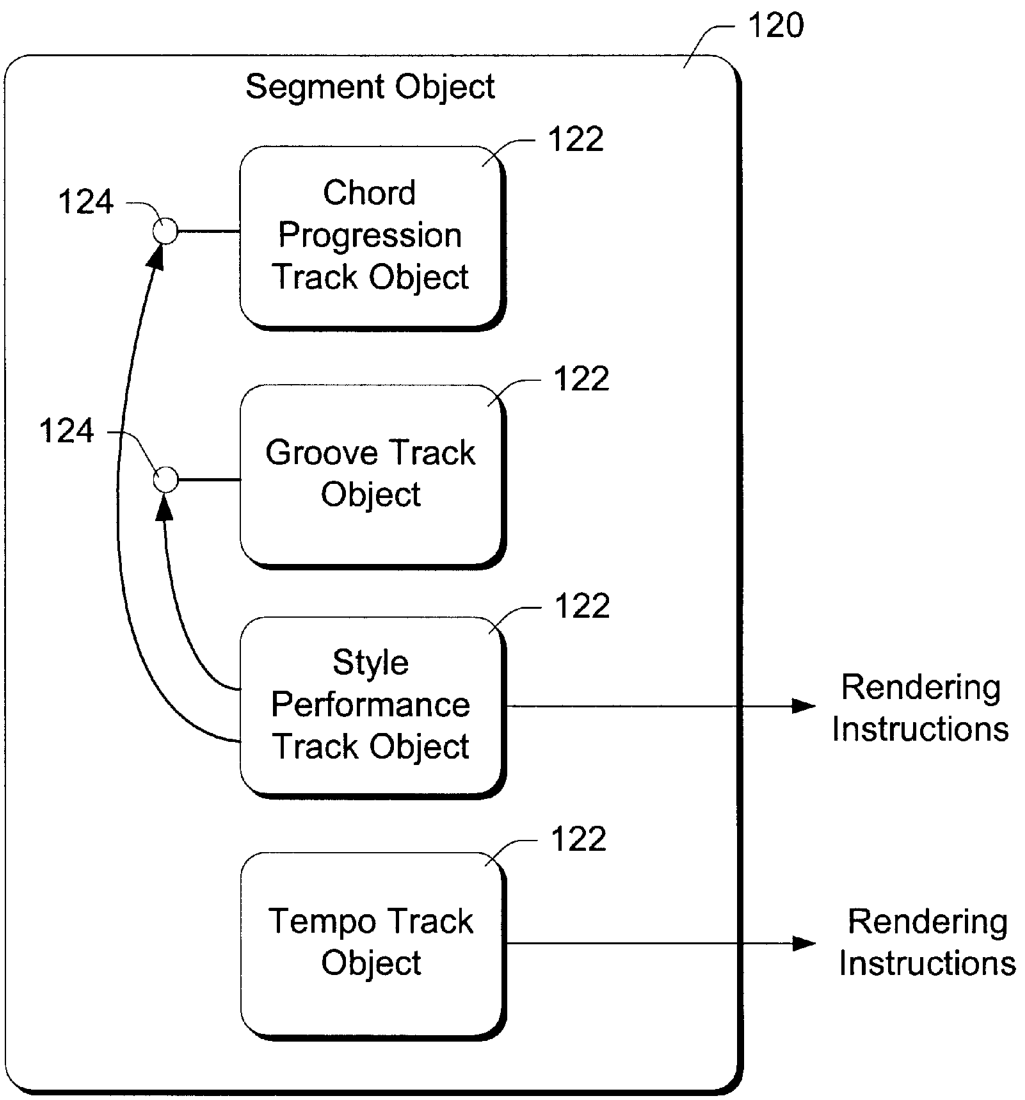
FIG. 3 is a block diagram of software components in accordance with the invention for rendering style-based music.

FIG. 3 shows a more complex example that allows adaptive creation of music. It includes a segment object 120 and a set of track objects 122 that cooperate to generate style-based and chord-based music. The track objects represent a chord progression track, a groove track, a style performance track, and a tempo map track. The chord progression track defines a sequence of chords. The groove track defines an intensity for the musical piece, which can vary as the piece progresses. The groove track also defines embellishments such as intros, breaks, endings, etc. The style performance track defines a note pattern in terms of the structures defined by the chord progression and groove tracks. The tempo track determines the tempo of the musical piece, which can vary as the piece progresses.

In the example of FIG. 3, only the style performance track object and the tempo map track object generate actual instructions for downstream music rendering components such as a MIDI-based music generation component. The chord progression track object and the groove track object are used as a source of data for the style performance track object. As described below, the track objects have inter-track interfaces 124 that allow data communications between track objects, thereby allowing one track to utilize data from another. In addition, track objects can have interfaces that accept commands during actual performance of a musical piece, thereby allowing an application program to vary the musical piece during its performance.

Various other types of track objects are possible, utilizing widely varying forms of music generation. For example, track objects might utilize synchronized streaming audio wave files or combinations of pre-recorded audio files. Other track objects might render music with synchronized textual lyrics (such as in a karaoke device). Track objects might also use algorithmic techniques to generate music.

Because the described embodiment of the invention is implemented with COM technology, each type of track corresponds to an object class and has a corresponding object type identifier or CLSID (class identifier). A track object as shown in FIG. 2 or FIG. 3 is actually an instance of a class. The instance is created from a CLSID using a COM function called CoCreateInstance. When first instantiated, the track object does not contain actual music performance data (such as a MIDI sequence or chord progression). However, each track exposes a stream I/O interface method through which music performance data is specified. FIG. 2 assumes that each track object has already been initialized with its music performance data. The process of instantiating and initializing the track objects will be explained in more detail below.

A particular track object class is designed to support a specific type of music generation technology, which generally corresponds to a particular type of music-related data. For example, MIDI object classes are designed to support MIDI-formatted data, and define functions for rendering music from such data. The rendering functions of different classes differ depending on the type of music performance data that is accepted and interpreted.

All of the track objects, regardless of the track object classes from which they were instantiated, support an identical object interface referred to as a track interface 110. Track interface 110 includes a track play method that is callable to play a time-delineated portion of a track.

Although track objects are instantiated from different object classes, all segment objects are instantiated from the same object class. The segment object class is defined to expose a segment interface 112. Segment interface 112 includes a number of methods, including a segment play method that is callable to play a time-delineated portion of the overall musical piece represented by the segment object.

To play a particular musical piece, performance manager 105 calls segment object 102 and specifies a time interval or duration within the musical piece represented by the segment. The segment object in turn calls the track play methods of each of its track objects, specifying a time interval corresponding to the interval or duration specified to the segment object. The track objects respond by rendering their music at the specified times.

This architecture provides a great degree of flexibility. A particular musical piece is implemented as a segment object and a plurality of associated track objects. Playback program 101 and its performance manager 105 play the musical piece by making repeated calls to segment interface 112 to play sequential portions of the musical piece. The segment object, in turn, makes corresponding calls to the individual track interfaces 110. The track objects perform the actual music generation, independently of the playback program, of the performance object, and of the segment object.

Because of this architecture, the independence of the track objects, and the support for identical predefined track interfaces, the playback program itself is not involved in the details of music generation. Thus, a single playback program can support numerous playback technologies, including technologies that are conceived and implemented after completion of the playback program.

Inter-Track Communications and Track Grouping

As illustrated in FIGS. 2 and 3, music generation using a particular music generation technology often utilizes a set of tracks rather than just an individual track. Inter-track communications capabilities are provided in some cases so that individual tracks within a set can cooperate with each other to generate music. In order to accomplish inter-track communications, track object classes are designed to include specialized communication interfaces (such as interfaces 124 of FIG. 3) that meet the needs of particular music generation technologies. In contrast to the track interface described above, which must be supported by each track object, each communications interface is potentially unique to a particular class of track objects. When designing a set of object classes for a particular music generation technology, the communications interfaces are designed to meet the needs of that particular technology.

Playback program 101, performance object 105, and segment object 102 are not involved in the particulars of inter-track communications. Thus, except for the required support of the track interface, the track objects do not need to conform to any preset requirements. This allows new track object classes to be designed and used whenever a new music generation technology is developed, without requiring changes to the playback program or to the segment object class.

Assuming that a segment has only one track object of any given type, the track objects identify each other by their CLSIDs. A first track object obtains a pointer to another track object by calling a method of the segment interface (described in more detail below) with a specified CLSID. In response, the segment interface determines whether the segment includes a track object that was created from the specified CLSID, and returns a pointer to the IUnknown interface (a standard COM interface) of any such track object.

In some cases, it will be desired for particular segment to include more than one track object of a given type or class. For example, two style tracks might play against two different chord progression tracks. In this case, CLSIDs alone do not uniquely identify a track object, since each track object of a particular type will have the same CLSID.

In accordance with the invention, tracks objects of the same type are assigned to different groups for further identification and differentiation. Thus, a first style track object and its corresponding chord progression track object are assigned to a first group, and the second style track object and its corresponding chord progression track object are assigned to a second group.

Any given track object can belong to one or more track groups. Thus, two different style tracks can be configured to play against the same chord progression track, by assigning each style track to a different group, and assigning the chord progression track to both groups.

The group assignments are used when identifying track objects to the segment object. Thus, when a first track object requests a pointer to a second track object, the first track object specifies its own group assignment and the CLSID of the second requested track object. The segment object responds by returning a pointer to a track object having both the specified group assignment and the specified CLSID.

As a further way to distinguish between tracks objects, an optional index value is specified whenever referencing a particular track object. This allows each group to contain more than one track object of the same type or class.

In the described embodiment, a particular group assignment is specified as a bit array having 32 bit positions. Each bit position corresponds to a particular group. Setting a bit specifies the corresponding group. This scheme allows specification of more than one group, by setting more than one bit within the bit array.

The index assignment is represented by an integer.

The actual use of the group and index assignments will become more clear in the following descriptions of the track and segment interfaces.

Track Interface Methods

Track interface 110 supports the following primary methods:

Initialize. The Initialize method is called by the segment object to initialize a track object after creating it. This method does not load music performance data. Such data is loaded through the IPersistStream interface, as described below. The group and index assignments of the new track object are specified as arguments to this method.

InitPlay. The InitPlay method is called prior to beginning the playback of a track. This allows the track object to open and initialize internal state variables and data structures used during playback. Some track objects might use this to trigger specific operations. For example, a track that manages the downloading of configuration information might download the information in response to its InitPlay method being called.

EndPlay. This method is called by the segment object upon finishing the playback of a track. This allows the track object to close any internal state variables and data structures used during playback. A track that manages the downloading of configuration information might unload the information in response to its EndPlay method being called.

Play. This method accepts arguments corresponding to a start time, an end time and an offset within the music performance data. When this method is called, the track object renders the music defined by the start and end times. For example, a note sequence track would render stored notes. A lyric track would display words. An algorithmic music track would generate a range of notes. The offset indicates the position in the overall performance relative to which the start and end times are to be interpreted.

Clone. This method causes the track object to make an identical copy of itself. The method accepts start and end times so that a specified piece of the track can be duplicated.

Segment Interface Methods

The segment object methods include methods for setting playback parameters of a segment, methods for access and managing tracks of a segment, and methods for managing playback of a segment.

The described embodiment of the invention includes the following primary methods:

Play. This method accepts an argument indicating the length of a musical interval to be played. In response, the segment object calls the Play methods of the segment's track objects with corresponding time parameters. The segment Play method returns an argument indicating the length of time which was actually played by the tracks.

Length. The Length method is invoked to specified a length for the segment.

Repeat. The segment's Repeat method is invoked to specify a number of times the musical piece represented by the segment is to be repeated.

Start. This method is invoked to specify a time within the musical piece at which playback is to be started.

Loop. The Loop method is invoked to specify start and end points of a repeating part of the musical piece.

InsertTrack. This method specifies to the segment object that an identified track object forms part of the musical piece. The CLSID of the inserted track is specified as an argument to this method.

InsertTrack also accepts a bit field argument that specifies the group assignments of the inserted track object. In response to invocation of this method, the segment object calls the Init method of the inserted track, specifying the group assignments of the track. No index value is specified-tracks within a single group are ordered in order of their insertion.

RemoveTrack. This method specifies to the segment object that an identified track object no longer forms part of the musical piece.

SegmentInitialize. Called to initialize the track objects of the musical piece. In response, the segment object calls the InitPlay methods of the track objects.

GetTrack. This is a method that is called by track objects and that returns pointer references to other identified track objects. A call to this method includes a specification of a CLSID, a group specification (in the form of a bit field as described above), and an index value. In response, the segment object identifies any track object that matches the specified parameters, and returns a pointer to the track object to the requesting track object.

Clone. Creates a copy of the segment object, and calls the Clone methods of the track objects. This is used by such things as authoring components to build a duplicate of a segment for subsequent modification.

Object Creation and File I/O Methods

In accordance with the invention, segment-related data is stored in a segment data stream containing track performance data (such as note sequences and chord progressions). The segment data stream utilizes a well-known format such as the Resource Interchange File Format (RIFF). A RIFF file includes a file header followed by what are known as "chunks." In the described embodiment of the invention, the file header contains data describing a segment object, such as length of the segment, the desired start point within the segment, a repeat count, and loop points. Each of the following chunks corresponds to a track object that belongs to the segment.

Each chunk consists of a chunk header followed by actual chunk data. A chunk header specifies a CLSID that can be used for creating an instance of a track object. Chunk data consists of the track performance data in a format that is particular to the track object defined by the CLSID of the chunk.

The segment objects and track objects both support the standard COM interface referred to as IPersistStream, which provides a consistent mechanism for reading data from a file or other stream. The IPersistStream interface includes a Load method which is used by the segment and track objects to load chunk data.

To create a segment object and its track objects from a stored RIFF file, playback program 105 first instantiates a segment object using the conventional COM function CoCreateInstance. It then calls the Load method of the segment object, specifying a RIFF file stream. The segment object parses the RIFF file stream and extracts header information. When it reads individual chunks, it creates corresponding track objects based on the chunk header information. Specifically, it determines the CLSID of a track object from a chunk header, and Calls CoCreateInstance to create a track object based on the CLSID. It then invokes the Load method of the newly created track object, and passes a pointer to the chunk data stream. The track object parse the chunk data, which defines track performance data for the created track object, and then returns control to the segment object which continues to create and initialize additional track objects in accordance with whatever chunks are found in the RIFF file.

Methodological Aspects of the Invention

Figure 4:
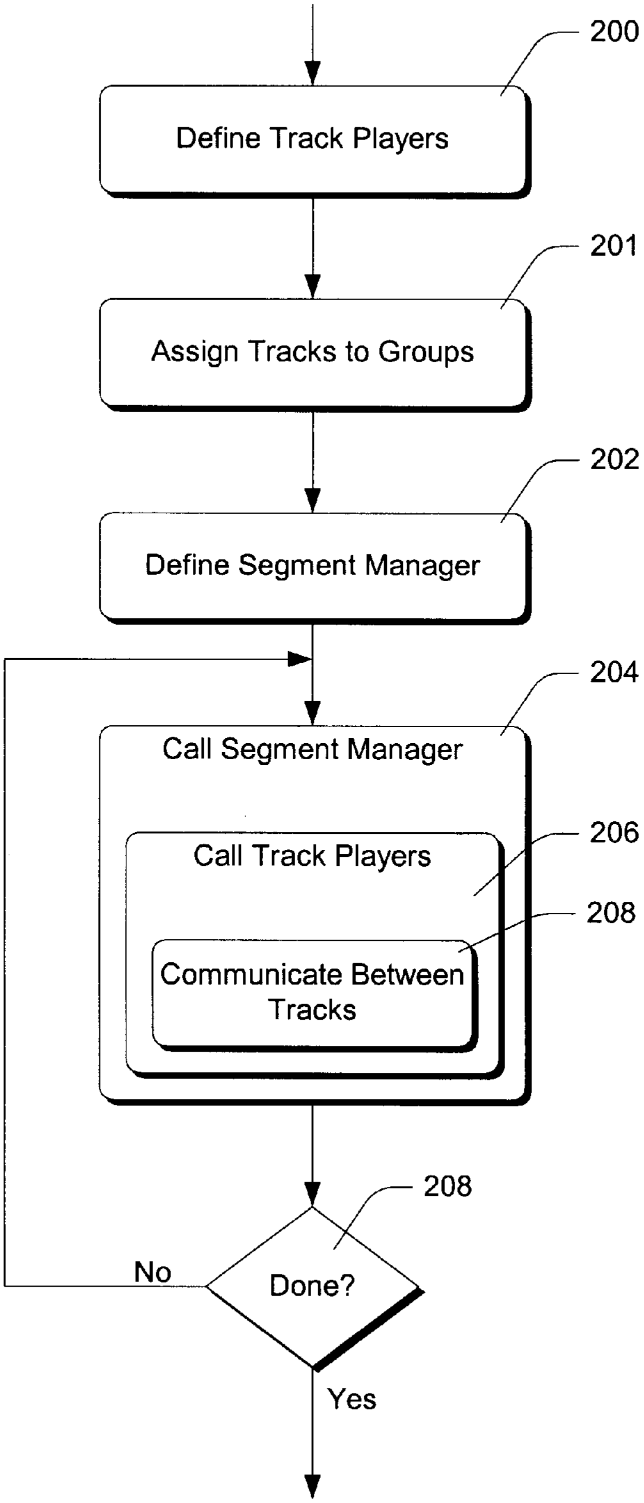
FIG. 4 is a flowchart showing preferred steps in accordance with the invention.

FIG. 4 illustrates methodological steps in accordance with the described embodiment of the invention. A step 200 comprises defining a plurality of track players (referred to above as track objects) representing different musical tracks that are to be played together to form a musical piece. A step 201 comprises assigning each track player to one or more groups of track players. Step 202 comprises defining a segment manager (referred to above as a segment object) that represents the musical piece. The segment manager references the track objects.

A step 204 comprises repeatedly instructing a segment manager to play a time-delineated portion of the musical piece. In response, the segment manager performs a step 206 of calling the various track players to play time-delineated portions of different musical tracks, wherein the tracks form the musical piece. Step 206 includes a step 208 of communicating between the track players. Such communication allows the track players to cooperate with each other to play music based on different music representations and technologies. The repetition of steps 204, 206, and 208 are indicated by a decision block 210.

Conclusion

The invention allows the bundling of any conceivable collection of performance techniques into one package, implemented above as a segment object. The substance of the segment—all of the information that gives it unique behavior—is represented by a series of plug-in tracks, each of which supports a standard track interface. Because almost all of the information that defines a segment is stored in tracks, and because tracks can be just about anything, the segment object itself is a relatively simple object.

This allows tremendous flexibility and expandability, while also simplifying the design of performance supervisors, which can utilize segments and tracks with very little effort.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable media containing a computer program that is defined at least in part by objects stored in the computer-readable media, the objects comprising:

a plurality of track objects representing different musical tracks that can be played together to form a musical piece;

a segment object that represents the musical piece;

wherein each track object exposes a track play method that is callable to play a time-delineated portion of its musical track;

wherein the segment object exposes a segment play method that is callable to play a time-delineated portion of the musical piece;

wherein the segment play method invokes the track play methods of the track objects to play the time-delineated portion of the musical piece.

2. One or more computer-readable media as recited in claim 1, wherein a set of the track objects corresponds to a particular music generation technique.

3. One or more computer-readable media as recited in claim 1, wherein a set of the track objects corresponds to a particular music generation technique, said set of track objects having interfaces that allow communications between said set of track objects.

4. One or more computer-readable media as recited in claim 1, wherein the track objects are of different types corresponding to different track types.

5. One or more computer-readable media as recited in claim 1, wherein:

the track objects are of different types corresponding to different track types;

each type of track object is identified by an object type identifier; and tracks objects of the same type are assigned to different groups for further identification and differentiation between track objects of the same type.

6. One or more computer-readable media as recited in claim 1, wherein:

track objects belong to one or more groups of track objects;

the track objects communicate with each other through inter-track interfaces;

the segment object has a get track method that returns a reference to an identified track object;

the identified track object is identified to the get track method by an object type identifier and by a group specification.

7. One or more computer-readable media as recited in claim 1, the objects further comprising a performance object that repeatedly calls the segment play method to play the musical piece.

8. One or more computer-readable media as recited in claim 1, wherein the track objects render music based on different music generation techniques.

9. One or more computer-readable media as recited in claim 1, wherein the track objects render music based on different music generation techniques, said music generation techniques including one or more of the following techniques:

note sequencing;

MIDI sequencing;

lyrics display;

audio streaming;

style-based chord progression;

template-based music composition; and motif-based music enhancement.

10. One or more computer-readable media as recited in claim 1, wherein a set of the track objects corresponds to a MIDI sequencing music generation technique.

11. One or more computer-readable media as recited in claim 1, wherein a set of the track objects corresponds to a MIDI sequencing music generation technique, said set of track objects comprising an event track object, a system exclusive track object, and a tempo map track object.

12. One or more computer-readable media as recited in claim 1, wherein a set of the track objects corresponds to a style-based chord progression music generation technique.

13. One or more computer-readable media as recited in claim 1, wherein a set of the track objects corresponds to a style-based chord progression music generation technique, said set of track objects comprising a chord progression track object and a style-based performance track object that plays a chord progression defined by the chord progression track.

14. One or more computer-readable media as recited in claim 1, wherein:

the segment object exposes a segment load method that is callable to load a segment data stream containing track performance data for the track objects;

each track object exposes a track load method that is callable to load an individual track data stream containing the track performance data for the track object;

the segment object parses the segment data stream to identify individual track data streams corresponding to the track objects;

the segment object calls the track load methods with the corresponding individual track data streams.

15. One or more computer-readable media as recited in claim 1, wherein the segment object exposes further methods comprising:

a segment load method that loads a segment data stream containing track performance data for the track objects;

a segment length method that is invoked to specify a length of the musical piece;

a segment repeat method that is invoked to specify a number of times the musical piece is to be repeated;

a segment start method that is invoked to specify a time within the musical piece at which playback is to be started;

a segment loop method that is invoked to specify start and end points of a repeating part of the musical piece;

a get track method that returns a reference to an identified track object;

an insert track method that specifies to the segment object that an identified track object forms part of the musical piece;

a remove track method that specifies to the segment object that an identified track object no longer forms part of the musical piece;

a segment initialize method that initializes the track objects prior to playback of the musical piece.

16. One or more computer-readable media as recited in claim 15, wherein the get track method accepts arguments comprising a bit array whose bits identify respective groups of track objects.

17. A computer-implemented method of playing a musical piece, comprising the following steps:

repeatedly instructing a segment manager to play a time-delineated portion of the musical piece;

in response to being instructed to play the time-delineated portion of the musical piece, calling a plurality of track players from the segment manager to play time-delineated portions of different musical tracks;

wherein the musical tracks form the musical piece.

18. A method as recited in claim 17, wherein:

the segment manager is a programming object having a segment interface for receiving instructions to play the time-delineated portion of the musical piece;

each track manager is a programming object having a track interface for receiving instructions to play a time-delineated portion of a corresponding musical track.

19. A method as recited in claim 17, wherein the track players render music based on different music generation techniques.

20. A method as recited in claim 17, wherein a set of the track players cooperate to play musical tracks in accordance with a particular music generation technique.

21. A method as recited in claim 17, further comprising:

communicating between the plurality of the track players to play musical tracks in accordance with a particular music generation technique;

assigning each track player to one or more groups of track players;

differentiating between the plurality of track players by their group designations.

22. A method as recited in claim 17, wherein the track players render music based on different music generation techniques, said music generation techniques including one or more of the following techniques:

note sequencing;

MIDI sequencing;

lyrics display;

audio streaming;

style-based chord progression;

template-based music composition; and motif-based music enhancement.

23. A method as recited in claim 17, wherein a set of the track players cooperate to render music based on a MIDI sequencing music generation technique.

24. A method as recited in claim 17, wherein a set of the track players cooperate to render music based on an event track, a system exclusive track, and a tempo map track.

25. A method as recited in claim 17, wherein a set of the track players cooperate to render music based on a style-based chord progression music generation technique.

26. A method as recited in claim 17, wherein a set of the track players cooperate to render music based on a chord progression track and a style-based performance track that plays a chord progression defined by the chord progression track.

27. A computer-readable storage medium containing a program, the program comprising instructions that perform the steps recited in claim 17.

28. A computer that is programmed to perform steps comprising:

defining a plurality of track objects representing different musical tracks that can be played together to form a musical piece;

defining a segment object that represents the musical piece wherein the segment object references the track objects;

repeatedly instructing the segment object to play a time-delineated portion of the musical piece;

in response to being instructed to play the time-delineated portion of the musical piece, calling the plurality of track objects from the segment object to play time-delineated portions of the different musical tracks.

29. A computer as recited in claim 28, wherein a set of the track objects corresponds to a particular music generation technique, said set of track objects having interfaces that allow communications between said set of track objects.

30. A computer as recited in claim 28, wherein the track objects are of different types corresponding to different track types.

31. A computer as recited in claim 28, wherein:

the track objects are of different types corresponding to different track types;

each type of track object is identified by an object type identifier; and tracks objects of the same type are assigned to different groups for further identification and differentiation between track objects of the same type.

32. A computer as recited in claim 28, wherein:

track objects belong to one or more groups of track objects;

the track objects communicate with each other through inter-track interfaces;

the segment object has a get track method that returns a reference to an identified track object;

the identified track object is identified to the get track method by an object type identifier and by a group specification.

33. A computer as recited in claim 28, wherein the track objects render music based on different music generation techniques.

34. A computer as recited in claim 28, wherein the track objects render music based on different music generation techniques, said music generation techniques including one or more of the following techniques:

note sequencing;

MIDI sequencing;

lyrics display;

audio streaming;

style-based chord progression;

template-based music composition; and motif-based music enhancement.

35. A computer as recited in claim 28, wherein a set of the track objects corresponds to a particular music generation technique.

36. A computer as recited in claim 28, wherein a set of the track objects corresponds to a MIDI sequencing music generation technique.

37. A computer as recited in claim 28, wherein a set of the track objects corresponds to a MIDI sequencing music generation technique, said set of track objects comprising an event track object, a system exclusive track object, and a tempo map track object.

38. A computer as recited in claim 28, wherein a set of the track objects corresponds to a style-based chord progression music generation technique.

39. A computer as recited in claim 28, wherein a set of the track objects corresponds to a style-based chord progression music generation technique, said set of track objects comprising a chord progression track object and a style-based performance track object that plays a chord progression defined by the chord progression track.

40. A computer as recited in claim 28, wherein:

the segment object exposes a segment load method that is callable to load a segment data stream containing track performance data for the track objects;

each track object exposes a track load method that is callable to load an individual track data stream containing the track performance data for the track object;

the segment object parses the segment data stream to identify individual track data streams corresponding to the track objects;

the segment object calls the track load methods with the corresponding individual track data streams.

41. A computer as recited in claim 28, wherein the segment object exposes further methods comprising:

a segment load method that loads a segment data stream containing track performance data for the track objects;

a segment length method that is invoked to specify a length of the musical piece;

a segment repeat method that is invoked to specify a number of times the musical piece is to be repeated;

a segment start method that is invoked to specify a time within the musical piece at which playback is to be started;

a segment loop method that is invoked to specify start and end points of a repeating part of the musical piece;

a get track method that returns a reference to an identified track object;

an insert track method that specifies to the segment object that an identified track object forms part of the musical piece;

a remove track method that specifies to the segment object that an identified track object no longer forms part of the musical piece;

a segment initialize method that initializes the track objects prior to playback of the musical piece.

42. A computer as recited in claim 28, wherein the get track method accepts arguments comprising a bit array whose bits identify respective groups of track objects.

43. One or more computer-readable storage media containing instructions that are executable to implement an application programming interface, the application programming interface having methods comprising:

a segment play method that is callable to play a time-delineated portion of a musical piece;

a segment load method that loads a segment data stream containing track performance data for the track objects;

a segment length method that is invoked to specify a length of the musical piece;

a segment repeat method that is invoked to specify a number of times the musical piece is to be repeated;

a segment start method that is invoked to specify a time within the musical piece at which playback is to be started;

a segment loop method that is invoked to specify start and end points of a repeating part of the musical piece;

a get track method that returns a reference to an identified track object;

an insert track method that specifies to the segment object that an identified track object forms part of the musical piece;

a remove track method that specifies to the segment object that an identified track object no longer forms part of the musical piece;

a segment initialize method that initializes the track objects prior to playback of the musical piece.

44. One or more computer-readable storage media as recited in claim 43, the instructions being executable to implement a second application programming interface having a play method, the play method being callable to play a time-delineated portion of a musical track.

45. One or more computer-readable storage media as recited in claim 43, wherein the get track method accepts arguments comprising a bit array whose bits identify respective groups of track objects.

* * * * *